3,279,979
METHOD FOR CONTROLLING NEMATODES WITH DIMETHYLOLUREA MONOMER
Franciscus Benjamin Gribnau, Deventer, Johannes Adrianus van Berkum, Wageningen, and Louis Cornelis Struijs, Zeist, Netherlands, assignors to N.V. Exploitatiemaatschappij Elkabé, De Bilt, Netherlands
No Drawing. Filed Apr. 18, 1963, Ser. No. 273,824
Claims priority, application Germany, Apr. 21, 1962, N 21,487
6 Claims. (Cl. 167—22)

It is known that in combating nematodes and soil fungi harmful to plants, difficulties are encountered with the conventional combating agents, most of which are gaseous, on account of their often complicated manner of application. In addition, these substances have in many cases a long phytotoxic activity.

It is further known that polymerized methylolurea compounds (polymethylolurea) can be used for combating soil fungi (cf. Agricultural and Food Chemistry (1958) p. 675).

We have now found that a condensation product of urea and formaldehyde which consists predominantly of dimethylolurea in monomeric form has a strongly nematocidal and fungicidal activity. Methylolurea is also very active against other organisms harmful to the plants.

The invention accordingly relates to the use of a condensation product of urea and formaldehyde which consists predominantly of dimethylurea in monomeric form for the control of organisms harmful to plants.

The invention further relates to agents for the control of organisms harmful to plants which are composed of a condensation product of urea and formaldehyde which predominantly consists of dimethylolurea in monomeric form, as the active substance, and a carrier.

Organisms inciting plant diseases are, for example, nematodes, such as *Pratylenchus spp.* and *Rotylenchus spp.* (free-living root worms), *Meloidogyne spp.* (root gall eels), *Ditylenchus spp.* (stalk eels), *Heterodera spp.*, for example, the larvae of *Heterodera rostochiensis* (potato cysteneels), disease-producing fungi, such as *Streptomyces scabies*, which causes scab in potatoes, *Plasmodiophora brassicae*, which causes root knot in cabbage, *Rhizoctonia spp.*, *Phytium spp.* and the like.

The application of dimethylolurea as a plant protecting agent has the following important advantages:

(1) The phytotoxic after-effect is very slight, which is connected with the circumstance that, especially in the soil, the product is rapidly decomposed to form, in addition to the harmless urea, formaldehyde, which is volatile and disappears rapidly. Consequently, even on plots of ground treated with relatively large doses of dimethylolurea, new crops can be sown or planted a short time after the treatment. In addition, the remaining urea released in the decomposition of the dimethylolurea constitutes an important nitrogen fertilizer.

(2) Dimethylolurea in monomeric form has the advantage over the above-mentioned polymethylolurea that it is readily soluble in water, whereas polymethylolurea is hardly soluble and produces a very viscous liquid, which is probably an emulsion. By virtue of the good solubility of dimethylolurea, it may be used in high concentrations which rapidly kill the harmful organisms, without the danger of undesired effects, since after the organisms have been killed, the dimethylolurea is rapidly decomposed and then becomes inactive.

(3) Dimethylolurea is a good sprinkler, in contrast to the liquid, viscous polymethylolurea. The dimethylolurea is therefore easily distributed over the soil, even at low temperatures, e.g., in autumn, whereas the polymethylolurea is then so viscous that it can hardly be dispersed in water.

The dimethylolurea can be broadcast, atomized or sprayed as such, in the form of an aqueous solution or in admixture with a solid carrier. Suitable solid carrier materials are, for example, inert materials, such as sand and clay, organic materials or fertilizers. Suitable carriers are, for example, phosphorus fertilizers, the urea formed in the decomposition of the dimethylolurea being in itself an excellent nitrogen fertilizer.

It is also possible to use as carriers substances which present themselves a biocidal activity, and in this case even synergistic activities may occur. This is, e.g., the case when the dimethylolurea is admixed with an alkaline earth metal formiate, particularly calcium formiate, which is by itself an effective nematocide.

The invention is especially of importance in the control of organisms which are harmful to the plants in the soil and on the growing plants. Dimethylolurea may, however, also be used for exterminating these harmful organisms in seeds, bulbs, tubers and like agricultural or horticultural products, as well as for disinfecting agricultural and horticultural implements and materials such as potters' clay, compost, earth-foam and the like. Insofar as the plants are treated per se, it is always possible to combat the parasites without the plant material itself being damaged, if the treatment is effected when the plant material is in rest, and/or the preparations are applied in concentrations so low that no undesired phytotoxic activity occurs.

We claim:
1. A method of controlling nematodes which comprises contacting said nematodes with the condensation product of urea and formaldehyde consisting substantially of dimethylolurea monomer in an amount sufficient to destroy said organism.
2. A method of combating nematodes from nematode infested soil which comprises introducing to said soil a nematocidal amount of the condensation product of urea and formaldehyde consisting substantially of dimethylolurea monomer.
3. A method of controlling nematodes from nematode infested soil which comprises introducing to said soil a nematocidal amount of a nematocide composition consisting essentially of the condensation product of urea and formaldehyde consisting substantially of dimethylolurea monomer and a carrier selected from the group consisting of alkali formate and alkaline earth metal formate.
4. A method according to claim 3 wherein the carrier is calcium formate.
5. A nematocide composition consisting essentially of the condensation product of urea and formaldehyde consisting substantially of dimethylolurea monomer and a carrier selected from the group consisting of alkali formate and alkaline earth metal formate.
6. A nematocide composition according to claim 5 wherein the carrier is calcium formate.

References Cited by the Examiner
UNITED STATES PATENTS

| | | | |
|---|---|---|---|
| 2,085,806 | 7/1937 | Jones | 167—26 |
| 2,110,943 | 3/1938 | Remensnyder | 167—26 |
| 2,180,744 | 11/1939 | Maxcy | 167—39 |
| 3,074,845 | 1/1963 | Geary | 167—26 |
| 3,102,108 | 8/1963 | Aebi et al. | 167—26 |

OTHER REFERENCES

Agr. & Food Chem., vol. 6, No. 9 (1958, pp. 675–677, 167–22.

JULIAN S. LEVITT, *Primary Examiner.*
GEORGE A. MENTIS, *Assistant Examiner.*